US009908216B2

(12) United States Patent
Soma et al.

(10) Patent No.: US 9,908,216 B2
(45) Date of Patent: Mar. 6, 2018

(54) GRINDING WHEEL MANUFACTURING METHOD AND GRINDING WHEEL

(71) Applicant: JTEKT CORPORATION, Osaka-shi (JP)

(72) Inventors: Shinji Soma, Kashiwara (JP); Naoto Ono, Anjo (JP); Tomoyuki Kasuga, Nagoya (JP); Ryo Ito, Nagoya (JP)

(73) Assignee: JTEKT CORPORATION, Osaka-shi (JP)

( * ) Notice: Subject to any disclaimer, the term of this patent is extended or adjusted under 35 U.S.C. 154(b) by 159 days.

(21) Appl. No.: 14/372,082

(22) PCT Filed: Jan. 31, 2013

(86) PCT No.: PCT/JP2013/052136
§ 371 (c)(1),
(2) Date: Jul. 14, 2014

(87) PCT Pub. No.: WO2013/115295
PCT Pub. Date: Aug. 8, 2013

(65) Prior Publication Data
US 2014/0357171 A1 Dec. 4, 2014

(30) Foreign Application Priority Data

Jan. 31, 2012 (JP) ................................ 2012-018046
Jan. 31, 2012 (JP) ................................ 2012-018047
(Continued)

(51) Int. Cl.
*B24D 3/14* (2006.01)
*B24D 18/00* (2006.01)
(Continued)

(52) U.S. Cl.
CPC ................. *B24D 3/14* (2013.01); *B24D 3/18* (2013.01); *B24D 5/02* (2013.01); *B24D 18/0009* (2013.01); *C09K 3/1445* (2013.01)

(58) Field of Classification Search
CPC ........ B24D 18/0009; B24D 3/14; B24D 3/18; B24D 5/02; C09K 3/1445
See application file for complete search history.

(56) References Cited

U.S. PATENT DOCUMENTS 3,650,714 A * 3/1972 Farkas .................. C04B 41/009
228/124.1
3,850,590 A * 11/1974 Chalkley ................ B24D 3/348
51/295
(Continued)

FOREIGN PATENT DOCUMENTS

GB   1 310 686 A    3/1973
JP   3 245973      11/1991
(Continued)

OTHER PUBLICATIONS

JP H04-269172 A—English Machine Translation.*
(Continued)

*Primary Examiner* — Marc Carlson
(74) *Attorney, Agent, or Firm* — Oblon, McClelland, Maier & Neustadt, L.L.P.

(57) ABSTRACT

A method of manufacturing a grinding wheel, and a grinding wheel. After a first overcoat layer is formed on each of CBN abrasive grains, a second overcoat layer that is plastically deformed under a pressure lower than a pressure under which the first overcoat layer is deformed, is formed on the outer side of the first overcoat layer to manufacture coated abrasive grains. The coated abrasive grains are subjected to pressure-molding to be formed into a prescribed shape under a pressure that is equal to or higher than a pressure under which the second overcoat layer is plastically deformed. The
(Continued)

second overcoat layers are deformed and flow to form a molded material having a structure in which the first overcoat layers contact each other, and the flowing second overcoat layers are moved into clearances between the coated abrasive grains. By sintering this, CBN abrasive grains are dispersed at a prescribed distance that is determined by the degree of outer radius of each first overcoat layer, and vacancies are arranged therebetween at a prescribed density.

9 Claims, 7 Drawing Sheets

(30) Foreign Application Priority Data

Jun. 1, 2012 (JP) .................................. 2012-125733
Sep. 19, 2012 (JP) .................................. 2012-205688

(51) Int. Cl.
*B24D 5/02* (2006.01)
*B24D 3/18* (2006.01)
*C09K 3/14* (2006.01)

(56) References Cited

U.S. PATENT DOCUMENTS

| | | | | |
|---|---|---|---|---|
| 5,125,933 A * | 6/1992 | St. Pierre | ............. | C09K 3/1436 51/293 |
| 5,250,086 A * | 10/1993 | McEachron | ............. | B24D 3/06 51/293 |
| 5,300,129 A * | 4/1994 | Clark | ................... | C09K 3/1436 501/65 |
| 5,718,736 A * | 2/1998 | Onishi | ............... | B24D 18/0009 51/307 |
| 6,485,533 B1 * | 11/2002 | Ishizaki | ................... | B24D 3/10 51/293 |
| 6,887,288 B2 * | 5/2005 | Hokkirigawa | ....... | C09K 3/1409 51/293 |
| 8,043,393 B2 * | 10/2011 | Querel | ............... | B24D 18/0009 51/307 |
| 2002/0095871 A1 * | 7/2002 | McArdle | .................. | B24D 3/14 51/298 |
| 2003/0093956 A1 * | 5/2003 | Saak | ........................ | B24D 3/14 51/307 |
| 2003/0154658 A1 * | 8/2003 | Salmon | .................... | B24D 5/02 51/307 |
| 2005/0129975 A1 * | 6/2005 | Ihara | ........................ | B24D 3/06 428/678 |
| 2007/0074456 A1 * | 4/2007 | Orlhac | ..................... | B24D 3/00 51/307 |
| 2008/0222965 A1 * | 9/2008 | Querel | ................... | B24D 3/007 51/298 |
| 2010/0206941 A1 * | 8/2010 | Egan | .................... | C09K 3/1445 228/221 |
| 2011/0183142 A1 * | 7/2011 | Gebhardt | ................. | B24D 3/14 428/402 |
| 2013/0298471 A1 * | 11/2013 | Cai | .......................... | B24D 3/28 51/295 |
| 2015/0196991 A1 * | 7/2015 | Montross | ............... | B24D 3/342 37/452 |
| 2015/0290771 A1 * | 10/2015 | Li | ............................ | B24D 3/06 51/295 |

FOREIGN PATENT DOCUMENTS

| | | | |
|---|---|---|---|
| JP | 4 269172 | | 9/1992 |
| JP | H04269172 A | * | 9/1992 |
| JP | 6 79633 | | 3/1994 |
| JP | 07-75972 A | | 3/1995 |
| JP | 7-96464 A | | 4/1995 |
| JP | 7-108461 A | | 4/1995 |
| JP | 9 132771 | | 5/1997 |
| JP | 2003300166 A | * | 10/2003 |

OTHER PUBLICATIONS

International Preliminary Report on Patentability dated Aug. 5, 2014 in PCT/JP2013/052136 (English translation only).
Written Opinion dated May 7, 2013 in PCT/JP2013/052136 (English translation only).
International Search Report dated May 7, 2013 in PCT/JP13/052136 Filed Jan. 31, 2013.
Office Action dated Nov. 10, 2015 in Japanese Patent Application No. 2012-018047.
Extended European Search Report dated Oct. 12, 2015 in Patent Application No. 13744108.5.
Partial English Translation of a Notice of Reasons for the Rejection dated Jul. 5, 2016 in Japanese Patent Application No. 2012-205688.

\* cited by examiner

GRINDING WHEEL MANUFACTURING METHOD AND GRINDING WHEEL

TECHNICAL FIELD

The invention relates to a grinding wheel manufacturing method and a grinding wheel.

BACKGROUND ART

Patent Document 1 describes that, in order to improve the dispersiveness of abrasive grains in a vitrified bonded grinding wheel in which abrasive grains of CBN or diamond are used, abrasive grains coated each with a single overcoat layer are subjected to pressure-molding and then sintered to manufacture a grinding wheel containing vacancies.

PRIOR ART DOCUMENT

Patent Document

Patent Document 1: Japanese Patent Application Publication No. 9-132771

SUMMARY OF THE INVENTION

Problem to be Solved by the Invention

According to the conventional technique described above, the distribution density of abrasive grains can be varied by varying the thickness of the overcoat layer. However, it is difficult to vary the distribution density of an additive from place to place or to make the distribution density of vacancies equal to or lower than a prescribed value. This is because the overcoat layer is a single layer, and thus a structure in which the abrasive grains are uniformly dispersed in the overcoat layer is formed after molding. Further, the vacancies are generated from spaces of clearances between the coated abrasive grains at the time of pressure-molding, but these spaces cannot be made smaller than the clearances at the time when the coated abrasive grains are most densely charged. This is also the reason why it is difficult to make the distribution density equal to or lower than the prescribed value.

Means for Solving the Problem

In order to solve the above-described problem, the invention includes:

a coating step of manufacturing coated abrasive grains by forming a first overcoat layer on an outer side of each of abrasive grains and then forming at least one outer overcoat layer that is deformed under a pressure lower than a pressure under which the first overcoat layer is deformed, on an outer side of the first overcoat layer;

a pressure-molding step of charging the coated abrasive grains into a prescribed shape and then manufacturing a molded material by applying a pressure equal to or higher than a pressure under which the outer overcoat layer is deformed; and a sintering step of sintering the molded material.

According to one aspect of a method of the disclosure, a density of vacancies in the grinding wheel is adjusted by adjusting a thickness of the outer overcoat layer.

According to one aspect of a method of the disclosure, an amount of a plasticizer contained in the first overcoat layer is smaller than an amount of the plasticizer contained in the outer overcoat layer.

According to one aspect of a method of the disclosure, the first overcoat layer contains glass and is bonded by performing sintering at a temperature equal to or higher than a softening temperature of the glass.

According to one aspect of a method of the disclosure, the first overcoat layer is made of glass, and the outer overcoat layer is made of a mixture of glass and an additive.

According to one aspect of a method of the disclosure, the first overcoat layer is made of glass and CBN grains, and the outer overcoat layer is made of only glass or a mixture of glass and an additive.

In another aspect of the disclosure, a grinding wheel is manufactured by:

manufacturing coated abrasive grains by forming a first overcoat layer on each of CBN or diamond abrasive grains and then forming at least one outer overcoat layer that is deformed under a pressure lower than a pressure under which the first overcoat layer is deformed, on an outer side of the first overcoat layer;

charging the coated abrasive grains into a prescribed shape and then manufacturing a molded material by applying a pressure equal to or higher than a pressure under which the outer overcoat layer is deformed; and sintering the molded material According to one aspect of a grinding wheel of the disclosure, the first overcoat layer contains glass and is melded bonded by performing sintering at a temperature equal to or higher than a softening temperature of the glass.

According to one aspect of a grinding wheel of the disclosure, the first overcoat layer is made of glass, and the outer overcoat layer is made of a mixture of glass and an additive.

According to one aspect of a grinding wheel of the disclosure, the first overcoat layer is made of glass and CBN grains, and the outer overcoat layer is made of only glass or a mixture of glass and an additive.

According to one aspect of a grinding wheel of the disclosure, a density of vacancies is adjusted by adjusting a thickness of the outer overcoat layer.

Effects of the Invention

According to the disclosure, when pressure-molding is performed by applying a pressure equal to or higher than a pressure under which the outer overcoat layer is deformed, the outer overcoat layers are deformed and move so as to fill the clearances, but the first overcoat layers are less likely to be deformed. Thus, the molded material in which the first overcoat layers contact each other and the outer overcoat layers are charged in the clearances between the first overcoat layers is obtained. Without controlling a pressing force with a high degree of accuracy, it is possible to manufacture the grinding wheel in which the distance between the abrasive grains is a desired value by controlling the thickness of each first overcoat layer. Further, the molded material in which the outer overcoat layers are continued at a prescribed contact area or larger is obtained by pressure-molding. Therefore, even if the sintering time is short, it is possible to manufacture the grinding wheel with a high bonding strength.

According to one aspect of a method of the disclosure, it is possible to control the amount of the outer overcoat layers that move so as to fill the clearances by adjusting the thickness of each outer overcoat layer, and to manufacture the grinding wheel having a desired density of vacancies by setting the clearance filling ratio to a desired value.

According to one aspect of a method of the disclosure, it is possible to easily manufacture large coated abrasive grains in which the pressure under which the first overcoat layer is deformed is higher than the pressure under which the outer overcoat layer is deformed.

According to one aspect of a method of the disclosure, in the sintering step, it is possible to form an abrasive grain retaining layer that has high adhesion with the abrasive grains since the fluidity of the first overcoat layers is high. Thus, it is possible to manufacture the grinding wheel having a high abrasive grain retentivity.

According to another aspect of the disclosure, when pressure-molding is performed by applying a pressure equal to or higher than a pressure under which the outer overcoat layer is deformed, the outer overcoat layers are deformed and move so as to fill the clearances, but the first overcoat layers are less likely to be deformed. Thus, the molded material in which the first overcoat layers contact each other and the outer overcoat layers are charged in the clearances between the first overcoat layers is obtained. Without controlling a pressing force with a high degree of accuracy, it is possible to set the distance between the abrasive grains to a desired value by controlling the thickness of each first overcoat layer. Further, the molded material in which the outer overcoat layers are continued at a prescribed contact area or larger is obtained by pressure-molding. Therefore, even if the sintering time is short, it is possible to obtain the grinding wheel with a high bonding strength.

According to one aspect of a grinding wheel of the disclosure, in the sintering step, it is possible to form an abrasive grain retaining layer that has high adhesion with the abrasive grains since the fluidity of the first overcoat layers is high. Thus, it is possible to obtain the grinding wheel having a high abrasive grain retentivity.

According to one aspect of a grinding wheel of the disclosure, it is possible to control the amount of the outer overcoat layers that move so as to fill the clearances by adjusting the thickness of each outer overcoat layer, and to obtain the grinding wheel having a desired density of vacancies by setting the clearance filling ratio to a desired value.

MODE FOR CARRYING OUT THE INVENTION

Hereinafter, as an embodiment of the invention, an example of a vitrified bonded grinding wheel that contains a first overcoat layer formed on the outer side of each CBN abrasive grain, and a single outer overcoat layer (hereinafter, referred to as "second overcoat layer") formed on the outer side of each first overcoat layer will be described. As a first embodiment, a case where the second overcoat layer is deformed under a pressure lower than the pressure under which the first overcoat layer is deformed will be described.

Figure 1:
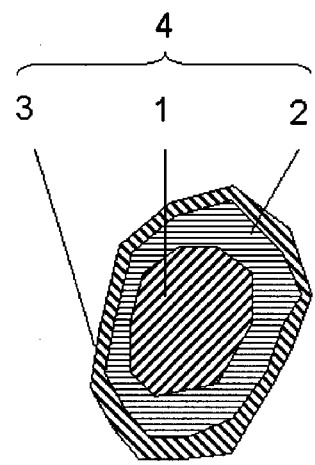
FIG. 1 is a schematic sectional view of a coated abrasive grain according to a first embodiment.

First, a coating step will be described in detail. In FIG. 1, a first overcoat layer 2 is a mixture of glass powder having a grain size of several micrometers or less, a binder such as polyacrylic acid ammonium salt or polyvinyl alcohol, and polyethylene glycol or the like as a plasticizer, and is formed by making the mixture adhere to CBN abrasive grains 1 (abrasive grains).

Next, a second overcoat layer 3 that has the same constituent materials as those of the first overcoat layer 2 but in which the amount of polyethylene glycol that is a plasticizer is larger than the amount of polyethylene glycol contained in the first overcoat layer 2 is made to adhere onto the first overcoat layer 2 to form a coated abrasive grain 4. The coated abrasive grain 4 has the following characteristics. The second overcoat layer 3 has plasticity higher than that of the first overcoat layer 2. When a pressure equal to or higher than a pressure under which the second overcoat layer 3 is plastically deformed is applied to the coated abrasive grain 4, the second overcoat layer 3 is plastically deformed largely. On the other hand, the first overcoat layer 2 is not deformed, or even if the first overcoat layer 2 is deformed, the amount of deformation is small.

Figure 2:
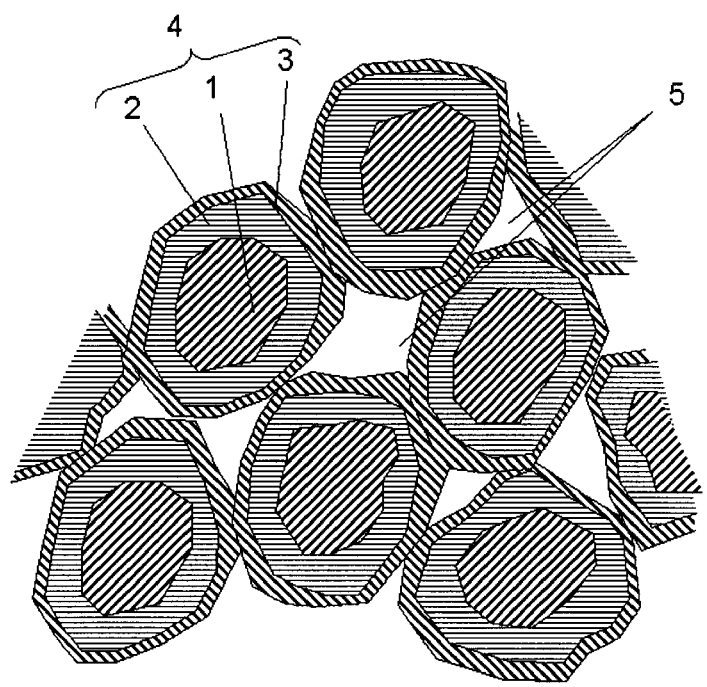
FIG. 2 is a schematic view of a structure in which the coated abrasive grains in the first embodiment are charged.
Figure 3:
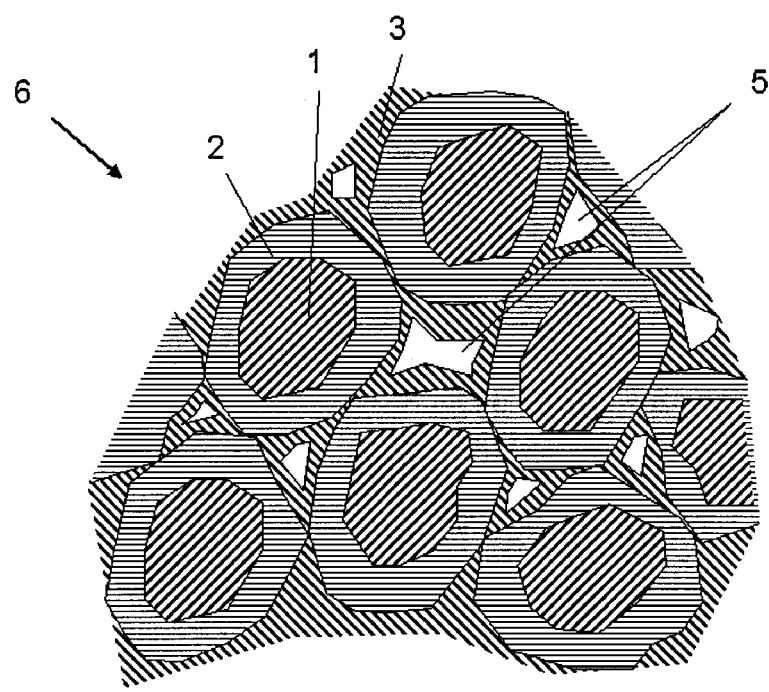
FIG. 3 is a schematic view of a molded material formed by subjecting the coated abrasive grains in the first embodiment to pressure-molding.

Next, a pressure-molding step will be described in detail. When the coated abrasive grains 4 are charged into a die having a desired shape, as illustrated in FIG. 2, the coated abrasive grains 4 contact each other at the outer peripheries of the second overcoat layers 3, thereby forming a state where there are prescribed clearances 5 corresponding to the particle sizes and shapes of the coated abrasive grains 4. Subsequently, a molded material 6 is formed by applying pressure via a pressing die (see FIG. 3). The pressing force needs to be a pressure higher than a minimum value of the pressures under which the second overcoat layer 3 is plastically deformed. In this case, further, the pressing force is set lower than a minimum value of the pressures under which the first overcoat layer 2 is plastically deformed. In this way, as illustrated in FIG. 3, the molded material 6 has a structure in which the second overcoat layers 3 are plastically deformed and thus the first overcoat layers 2 contact each other at their outer peripheries. At this time, the second overcoat layer 3 at contact portions flows so as to fill the clearances 5 to reduce the volume of the clearances 5. The degree of the reduction can be controlled by adjusting the thickness of each second overcoat layer 3. For example, in the case where the shape of each coated abrasive grains 4 is a generally spherical shape, when the second overcoat layers 3 are not formed, that is, when the thickness of each second overcoat layer 3 is zero, the volume ratio of the clearances is approximately 25%. When the thickness of each second overcoat layer 3 is set to a thickness of approximately 6% of the outer radius of each first overcoat layer 2, the volume ratio of the clearances is 0%. By selecting the thickness of each second overcoat layer 3 between these two conditions, the molded material 6 that has a desired volume ratio of clearances, that is, 25% or less, can be manufactured. After molding, the molded material 6 is degreased at a prescribed temperature equal to or higher than volatilization temperatures of the binder and the plasticizer.

Figure 4:
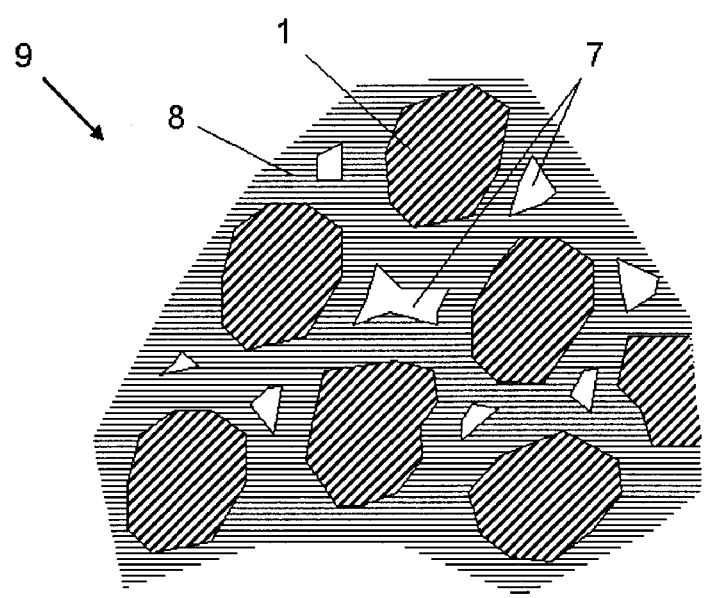
FIG. 4 is a schematic view of a vitrified bonded grinding wheel in the first embodiment.

Next, when the molded material 6 is sintered, as illustrated in FIG. 4, a vitrified bonded grinding wheel 9 that contains a bond layer 8 that is made of glass and that is formed through fusion between the first overcoat layers 2 and the second overcoat layers 3 is obtained. The vitrified bonded grinding wheel 9 has a structure in which, in the bond layer 8, the CBN abrasive grains 1 are dispersed at a prescribed distance determined by the degree of the outer radius of each first overcoat layer 2 and vacancies 7 generated from the clearances 5 are uniformly dispersed at a desired ratio.

When grinding is performed with the use of the vitrified bonded grinding wheel 9 in the first embodiment, since the CBN abrasive grains 1 and the vacancies 7 are uniformly dispersed at desired densities, the grinding wheel can exhibit the same grinding performance at any position.

In the present embodiment, the amount of plastic deformation of each second overcoat layer 3 is made larger than that of each first overcoat layer 2 by making the amount of plasticizer contained in the second overcoat layer 3 larger than that of the first overcoat layer 2. However, the first overcoat layers may be formed by making overcoat layers containing glass adhere to the abrasive grains and then performing sintering at a temperature equal to or higher than a softening temperature of the glass. In this way, the minimum value of the pressures under which the first overcoat layer is deformed increases and thus the difference with the minimum value of the pressures under which the second overcoat layer is plastically deformed can be made larger. Therefore, the pressure in the pressure-molding step can be easily set. Further, although an example in which polyethylene glycol is contained as the plasticizer is described, glycerin, propylene glycol or the like may be used as the plasticizer. The pressing force may be made higher than the pressure under which the first overcoat layer is deformed. In this case, although both the first overcoat layer and second overcoat layer are deformed, the same effect can be expected since the amount of deformation of the first overcoat layer is smaller. Although an example in which deformation of the second overcoat layer is plastic deformation is described, the deformation may be caused by crack or fracture. Further, in place of CBN abrasive grains 1, diamond abrasive grains may be used.

Modified Forms of the Present Embodiment

Figure 5:
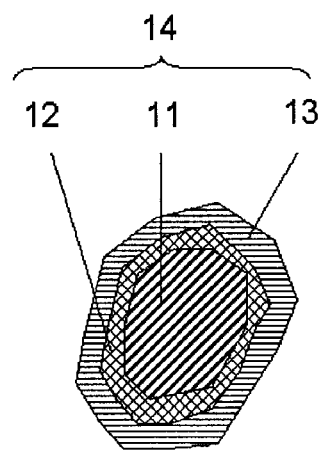
FIG. 5 is a schematic sectional view of a coated abrasive grain according to a second embodiment.

A second embodiment will be described. This realizes a structure of a grinding wheel in which desired materials are distributed at desired places by making constituent materials of a first overcoat layer and a second overcoat layer different from each other. In FIG. 5, a first overcoat layer 12 is a mixture of glass powder having a grain size of several micrometers or less, a binder such as polyacrylic acid ammonium salt or polyvinyl alcohol, and polyethylene glycol or the like as a plasticizer, and is formed by making the mixture adhere to CBN abrasive grains 1. Then, a second overcoat layer 13 is formed on the first overcoat layer 12.

The second overcoat layer 13 contains mixed power of glass powder having a grain size of several micrometers or less and hard particles having a grain size of several micrometers or less, such as mullite, alumina, titanium oxide, zirconium silicate or the like, the binder described above, and the plasticizer described above in an amount larger than the amount of plasticizer contained in the first overcoat layer 2.

Figure 6:
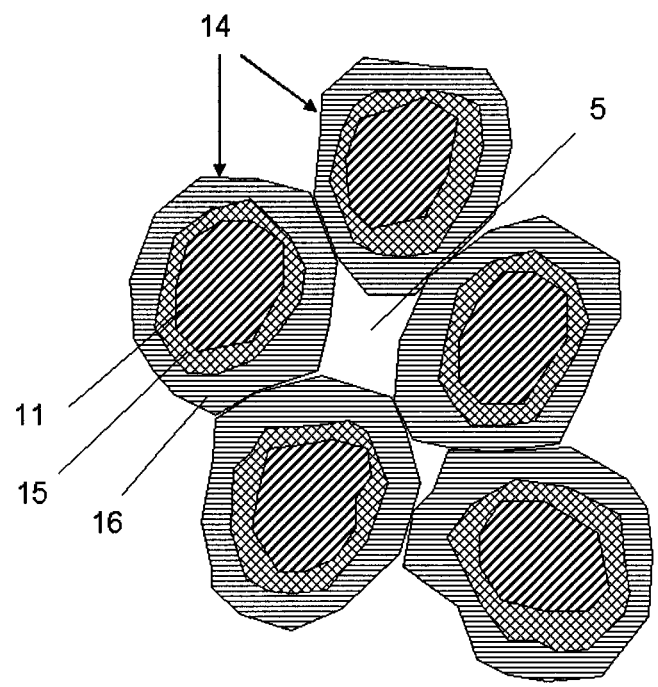
FIG. 6 is a schematic view of a molded material formed by subjecting the coated abrasive grains in the second embodiment to pressure-molding.

Next, the coated abrasive grains 14 having the structure described above are subjected to pressure-molding so as to be formed into a prescribed shape, and then degreased at a prescribed temperature equal to or higher than the volatilization temperature of the binder. A structure at this time contains, as illustrated in FIG. 6, a glass powder layer 15 formed on the outer side of each CBN abrasive grain 11, a mixed layer 16 of the glass powder and the hard particles, which is formed on the outer side of each glass powder layer 15, and clearances 5 formed between the coated abrasive grains 14.

Figure 7:
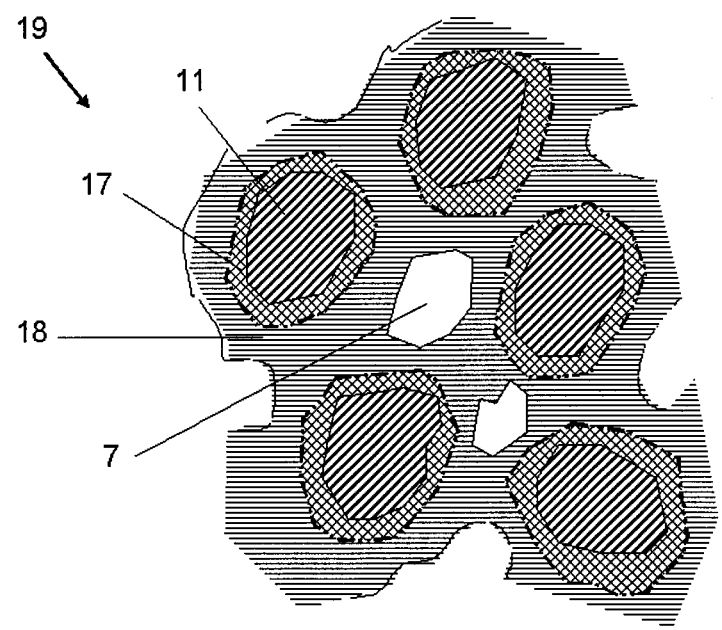
FIG. 7 is a schematic view of a vitrified bonded grinding wheel in the second embodiment.
Figure 8:
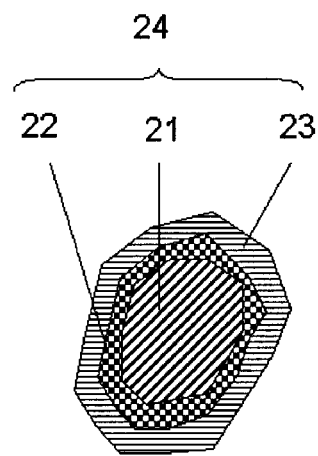
FIG. 8 is a schematic sectional view of a coated abrasive grain according to a third embodiment.

In this case, during sintering, the glass is softened, flows, and closely adheres to abrasive grains. However, it is a known fact that, if additive particles such as the hard particles described above are mixed, the fluidity of the glass is disturbed and the adhesion with the abrasive grains is reduced. However, in the coated abrasive grains in the present embodiment, since only the glass is present around the CBN abrasive grains 11, the glass that is softened during sintering sufficiently flows and adheres to the entire surface of each CBN abrasive grain 11. Therefore, the vitrified bonded grinding wheel 19 has, as illustrated in FIG. 7, a structure in which a bond layer formed of glass layers 17 that closely adhere to the entire surfaces of the CBN abrasive grains 11 and a mixed layer 18 in which glass and additive particles are mixed in portions apart from the CBN abrasive grains 11 is formed and vacancies 7 are dispersed in the mixed layer 18. That is, the vitrified bonded grinding wheel 19 in the present embodiment has the bond layer having two-layered structure formed of the glass layers 17 having high abrasive grain retentivity due to high adhesion with the CBN abrasive grains 11 and the mixed layer 18 having high abrasion resistance due to the hard particles contained therein.

When grinding is performed with the use of the vitrified bonded grinding wheel 19 in the second embodiment, although a grinding force is applied to the CBN abrasive grains 11, the CBN abrasive grains 11 are less likely to fall off since the glass closely adheres to the CBN abrasive grains 11 and the abrasive grain retentivity is high. Further, although the mixed layer 18 is subjected to an abrasion action due to flow of chips, abrasion is small due to the hard particles contained therein. As a result, it is possible to obtain the vitrified bonded grinding wheel 19 that is less-wearing even under high efficiency grinding.

In the embodiment described above, the abrasion resistance of the mixed layer 18 is improved by using the hard particles as the additive of the second overcoat layer 13. However, by adding particles having high friability such as hollow particles, dressing performance of the mixed layer may be improved. Further, in place of the CBN abrasive grains 11, diamond abrasive grains may be used.

A third embodiment will be described. As a result of study, it was found out that, when CBN fine powder is added, a reduction in the fluidity of the glass during sintering is small. Then, this finding is applied.

Since the third embodiment is the same as the second embodiment except for the composition of the first overcoat layer, regarding the manufacturing method, only a coating step will be described. As schematically illustrated in FIG.

8, a coated abrasive grain 24 contains a first overcoat layer 22 that is formed on the outer side of a CBN abrasive grain 21, and that is a mixture of glass powder, CBN powder, a binder such as polyacrylic acid ammonium salt or polyvinyl alcohol, and polyethylene glycol or the like as a plasticizer. There is a second overcoat layer 23 that is formed on the outer side of the first overcoat layer 22, that contains glass, hard particles (additive), the binder described above, and the plasticizer described above in an amount larger than the amount of plasticizer contained in the first overcoat layer 2.

Figure 9:
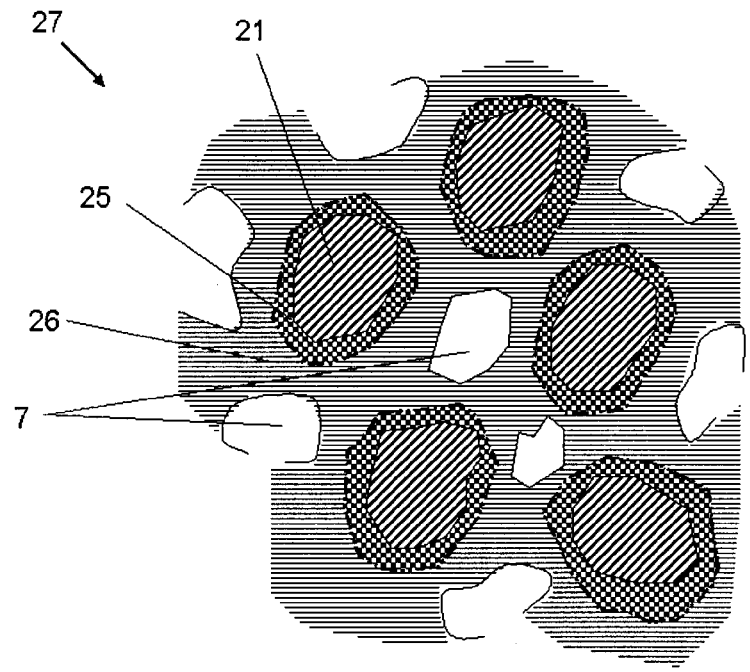
FIG. 9 is a schematic view of a vitrified bonded grinding wheel in the third embodiment.

When molding and sintering are performed using the abrasive grains 24, since the glass powder and the CBN powder contained in the first overcoat layer are distributed in the vicinity of the CBN abrasive grains 21, the glass sufficiently flows during sintering and adheres to the CBN abrasive grains 21. Therefore, the vitrified bonded grinding wheel 27 has, as illustrated in FIG. 9, a structure in which a bond layer formed of CBN additive layers 25 that closely adhere to the entire surfaces of the CBN abrasive grains 21 and a mixed layer 26 in which glass and additive particles are mixed in portions apart from the CBN abrasive grains 21 is formed and vacancies 7 are dispersed in the mixed layer 26.

Figure 10:
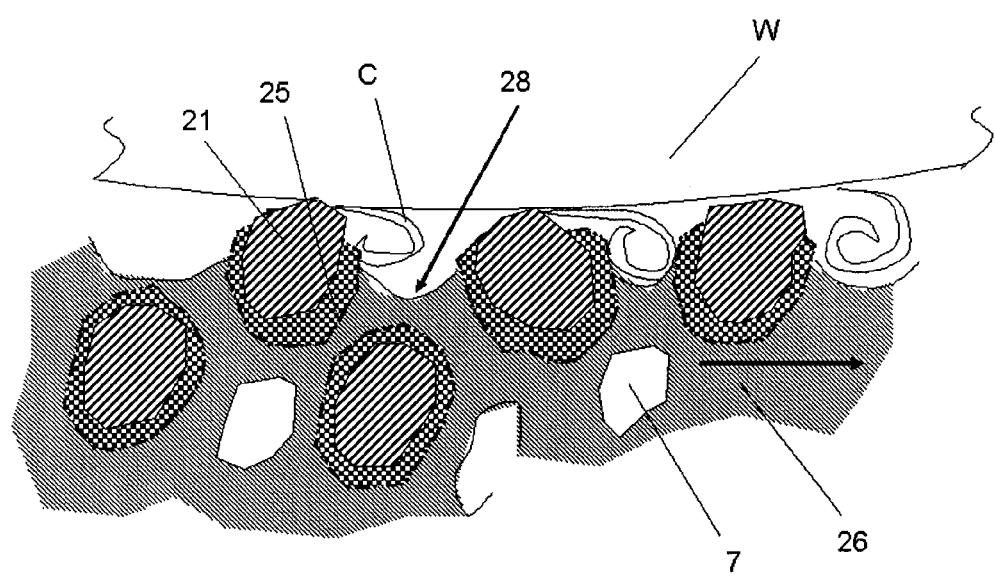
FIG. 10 is a schematic view of grinding with the use of the vitrified bonded grinding wheel in the third embodiment.

When workpiece W is ground with the use of the vitrified bonded grinding wheel 27 in the third embodiment, as illustrated in FIG. 10, chips C generated during grinding grow while contacting the CBN additive layers 25 and the mixed layer 26, are accumulated in chip pockets 28, and are then discharged after contact between the workpiece W and the vitrified bonded grinding wheel 27 ends. At this time, although a grinding force is applied to the CBN abrasive grains 21, the CBN abrasive grains 21 are less likely to fall off since the CBN additive layers 25 closely adhere to the CBN abrasive grains 21 and the abrasive grain retentivity is high. Further, although the mixed layer 26 is subjected to an abrasion action due to flow of the chips, abrasion is small due to the hard particles contained therein. Further, although the CBN additive layers 25 are also subjected to an abrasion action due to flow of the chips, abrasion is small due to the CBN fine powder contained therein. As a result, it is possible to obtain the vitrified bonded grinding wheel 27 that is further less-wearing than in the second embodiment, even under high efficiency grinding.

A fourth embodiment will be described. In the present embodiment, an improvement in the adhesion of abrasive grains, a desired abrasive grain distribution density, and a desired vacancy density are realized by forming a three-layered overcoat layer.

Figure 11:
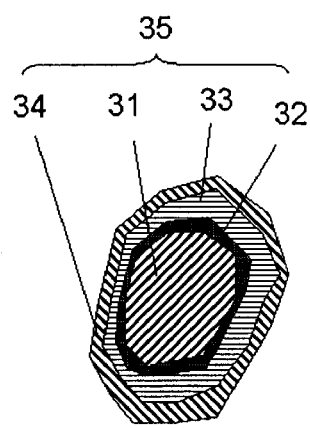
FIG. 11 is a schematic sectional view of a coated abrasive grain according to a fourth embodiment.

As illustrated in FIG. 11, a first overcoat layer 32 is a mixture of glass powder having a grain size of several micrometers or less and a binder such as polyacrylic acid ammonium salt or polyvinyl alcohol and is formed by making the mixture thinly adhere to a CBN abrasive grain 31. Next, a second overcoat layer 33 is formed on the first overcoat layer 32 by bonding a mixture of glass powder having a grain size of several micrometers or less, hard particles having a grain size of several micrometers or less, such as mullite, alumina, titanium oxide, zirconium silicate or the like, the binder described above, and polyethylene glycol as a plasticizer, and then drying the mixture. Then, a third overcoat layer 34 that contains the same constituent materials as those of the second overcoat layer 33 but in which the amount of polyethylene glycol that is the plasticizer is larger than the amount of polyethylene glycol contained in the second overcoat layer 33 is adhered onto the second overcoat layer 33 to form a coated abrasive grain 35.

Figure 12:
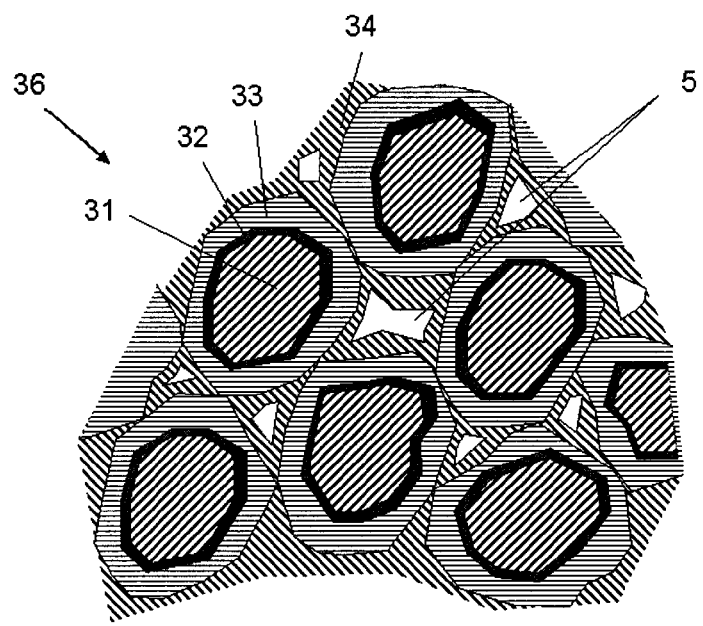
FIG. 12 is a schematic view of a molded material formed by subjecting the coated abrasive grains in the fourth embodiment to pressure-molding.

The coated abrasive grain 35 has the following characteristics. The third overcoat layer 34 has plasticity higher than that of the second overcoat layer 33. When a pressure equal to or higher than a pressure under which the third overcoat layer 34 is plastically deformed is applied to the coated abrasive grain 35, the third overcoat layer 34 is plastically deformed largely, but the second overcoat layer 33 is not deformed, or even if the second overcoat layer 33 is deformed, the amount of deformation is small. Therefore, as in the second embodiment, when a molded material 36 is formed by applying pressure, as illustrated in FIG. 12, the third overcoat layers 34 are plastically deformed to form a structure in which the outer peripheries of the second overcoat layers 33 contact each other. At this time, the third overcoat layer 34 at contact portions flows to the clearances 5 to reduce the volume of the clearances 5. The degree of the reduction can be controlled by adjusting the thickness of each third overcoat layer 34. The molded material 36 having a desired volume ratio of the clearances 5 can be manufactured. Then, a degreasing process is performed at a prescribed temperature equal to or higher than volatilization temperatures of the binder and the plasticizer.

Figure 13:
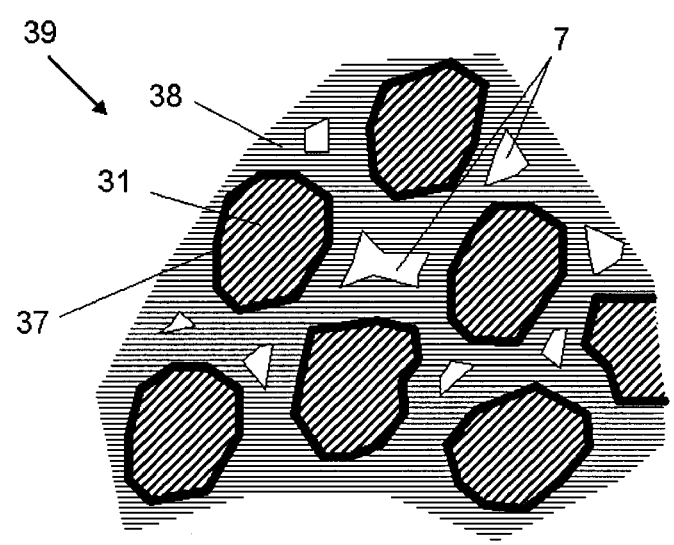
FIG. 13 is a schematic view of a vitrified bonded grinding wheel in the fourth embodiment.

Next, when sintering is performed, a vitrified bonded grinding wheel 39 as illustrated in FIG. 13 is obtained. In the vitrified bonded grinding wheel 39, there are formed thin glass layers 37 formed of the glass that is softened during sintering, and that sufficiently flows and adheres to the entire surfaces of the CBN abrasive grains 31, and a bond layer 38 which is formed at portions apart from the CBN abrasive grains 31 and formed through fusion between the second overcoat layers 33 and the third overcoat layers 34 and in which the glass and the additive particles are mixed. Further, the CBN abrasive grains 31 are dispersed in the bond layer 38 at a prescribed distance that is determined by the degree of the outer radius of each first overcoat layer 32, and vacancies 7 generated from the clearances 5 are arranged so as to be dispersed in the bond layer 38 at a desired ratio. That is, by reducing the thickness of each glass layer 37 that has high abrasive grain retentivity due to high adhesion with the CBN abrasive grains 31 but having a low abrasion resistance, the bond layer 38 having high abrasion resistance due to the additive particles contained therein is disposed as close as possible to the CBN abrasive grains 31 and thus portions that are susceptible to abrasion are reduced. As a result, the vitrified bonded grinding wheel 39 having high abrasion resistance is obtained.

INDUSTRIAL APPLICABILITY

As described in the four embodiments described above, when a vitrified bonded grinding wheel is manufactured from coated abrasive grains each containing multiple overcoat layers having different compositions, which are formed on the outer side of an abrasive grain, it is possible to uniformly disperse the abrasive grains and vacancies and to set distribution densities thereof to desired values. Further, by distributing additive particles at prescribed positions, a vitrified bonded grinding wheel having a desired bond strength can be manufactured.

DESCRIPTION OF REFERENCE NUMERALS 1, 11, 21: CBN ABRASIVE GRAIN
2, 12, 22: FIRST OVERCOAT LAYER
3, 13, 23: SECOND OVERCOAT LAYER
4, 14, 24: COATED ABRASIVE GRAIN
5: CLEARANCE

6: MOLDED MATERIAL
7: VACANCY
8: BOND LAYER
9, 19, 27: VITRIFIED BONDED GRINDING WHEEL

The invention claimed is:

1. A grinding wheel manufacturing method comprising:
forming a first overcoat layer containing a plasticizer on an outer side of each of abrasive grains, wherein the first overcoat layer contains glass;
forming, on an outer side of the first overcoat layer on each of the abrasive grains, at least one outer overcoat layer containing a plasticizer and made of a material that is deformed under a pressure lower than a pressure under which the first overcoat layer is deformed, wherein an amount of a plasticizer contained in the first overcoat layer is smaller than an amount of the plasticizer contained in the at least one outer overcoat layer;
charging the coated abrasive grains having the first overcoat layer and the outer overcoat layer formed thereon into a prescribed shape;
manufacturing a molded material by applying to the charged and coated abrasive grains a molding pressure equal to or higher than the pressure under which the outer overcoat layer is deformed; and
sintering the molded material at a temperature equal to or higher than a softening temperature of the glass, to bond the first overcoat layer.

2. The grinding wheel manufacturing method according to claim 1, wherein a density of vacancies in the grinding wheel is adjusted by adjusting a thickness of the outer overcoat layer.

3. The grinding wheel manufacturing method according to claim 1, wherein the molding pressure is lower than the pressure under which the first overcoat layer is deformed.

4. A grinding wheel manufacturing method comprising:
forming a first overcoat layer containing a plasticizer on an outer side of each of abrasive grains;
forming, on an outer side of the first overcoat layer on each of the abrasive grains, at least one outer overcoat layer containing a plasticizer and made of a material that is deformed under a pressure lower than a pressure under which the first overcoat layer is deformed, wherein an amount of a plasticizer contained in the first overcoat layer is smaller than an amount of the plasticizer contained in the at least one outer overcoat layer;
charging the coated abrasive grains having the first overcoat layer and the outer overcoat layer formed thereon into a prescribed shape;
manufacturing a molded material by applying to the charged and coated abrasive grains a molding pressure equal to or higher than the pressure under which the outer overcoat layer is deformed; and
sintering the molded material,
wherein the first overcoat layer is made of glass, and the outer overcoat layer is made of a mixture of glass and an additive.

5. The grinding wheel manufacturing method according to claim 4, wherein a density of vacancies in the grinding wheel is adjusted by adjusting a thickness of the outer overcoat layer.

6. The grinding wheel manufacturing method according to claim 4, wherein the molding pressure is lower than the pressure under which the first overcoat layer is deformed.

7. A grinding wheel manufacturing method comprising:
forming a first overcoat layer containing a plasticizer on an outer side of each of abrasive grains;
forming, on an outer side of the first overcoat layer on each of the abrasive grains, at least one outer overcoat layer containing a plasticizer and made of a material that is deformed under a pressure lower than a pressure under which the first overcoat layer is deformed, wherein an amount of a plasticizer contained in the first overcoat layer is smaller than an amount of the plasticizer contained in the at least one outer overcoat layer;
charging the coated abrasive grains having the first overcoat layer and the outer overcoat layer formed thereon into a prescribed shape;
manufacturing a molded material by applying to the charged and coated abrasive grains a molding pressure equal to or higher than the pressure under which the outer overcoat layer is deformed; and
sintering the molded material,
wherein the first overcoat layer is made of glass and CBN grains, and the outer overcoat layer is made of only glass or a mixture of glass and an additive.

8. The grinding wheel manufacturing method according to claim 7, wherein a density of vacancies in the grinding wheel is adjusted by adjusting a thickness of the outer overcoat layer.

9. The grinding wheel manufacturing method according to claim 7, wherein the molding pressure is lower than the pressure under which the first overcoat layer is deformed.

* * * * *